United States Patent
Brucker

(10) Patent No.: US 9,404,827 B2
(45) Date of Patent: Aug. 2, 2016

(54) IONIZATION GAUGE WITH OPERATIONAL PARAMETERS AND GEOMETRY DESIGNED FOR HIGH PRESSURE OPERATION

(71) Applicant: MKS Instruments, Inc., Andover, MA (US)

(72) Inventor: Gerardo A. Brucker, Longmont, CO (US)

(73) Assignee: MKS Instruments, Inc., Andover, MA (US)

( * ) Notice: Subject to any disclaimer, the term of this patent is extended or adjusted under 35 U.S.C. 154(b) by 130 days.

(21) Appl. No.: 14/174,386

(22) Filed: Feb. 6, 2014

(65) Prior Publication Data

US 2014/0152320 A1    Jun. 5, 2014

Related U.S. Application Data

(60) Division of application No. 12/860,050, filed on Aug. 20, 2010, now Pat. No. 8,648,604, which is a continuation of application No. PCT/US2009/034460, filed on Feb. 19, 2009.

(60) Provisional application No. 61/066,631, filed on Feb. 21, 2008.

(51) Int. Cl.
*G01L 21/30* (2006.01)
*G01L 21/32* (2006.01)
(Continued)

(52) U.S. Cl.
CPC ............... *G01L 21/30* (2013.01); *G01L 21/32* (2013.01); *G01L 21/34* (2013.01); *H01J 41/02* (2013.01)

(58) Field of Classification Search
CPC ......... G01L 21/30; G01L 21/32; G01L 21/34; H01J 41/02; H01J 41/06; H01J 41/04; G01N 27/62

USPC ............... 324/459–470; 313/309, 336, 363.1; 315/111.91, 95, 108
See application file for complete search history.

(56) References Cited

U.S. PATENT DOCUMENTS 3,353,048 A * 11/1967 Hagenlocher ........... H01J 41/04
                                                        313/7
4,093,913 A    6/1978  O'Neal, III
(Continued)

FOREIGN PATENT DOCUMENTS

JP    2007-181095 A    7/1995
JP    2010-213509 A    8/1998
(Continued)

OTHER PUBLICATIONS

International Search Report and the Written Opinion of the International Search Authority, mailed Jul. 31, 2009, for International Application No. PCT/US2009/034460.
(Continued)

*Primary Examiner* — Tung X Nguyen
*Assistant Examiner* — Thang Le
(74) *Attorney, Agent, or Firm* — Hamilton, Brook, Smith & Reynolds, P.C.

(57) ABSTRACT

An ionization gauge to measure pressure and to reduce sputtering yields includes at least one electron source that generates electrons. The ionization gauge also includes a collector electrode that collects ions formed by the collisions between the electrons and gas molecules. The ionization gauge also includes an anode. An anode bias voltage relative to a bias voltage of a collector electrode is configured to switch at a predetermined pressure to decrease a yield of sputtering collisions.

10 Claims, 6 Drawing Sheets

(51) Int. Cl.
*G01L 21/34* (2006.01)
*H01J 41/02* (2006.01)

(56) References Cited

U.S. PATENT DOCUMENTS

| | | | |
|---|---|---|---|
| 4,270,091 A | 5/1981 | Mann | |
| 4,307,323 A * | 12/1981 | Bills | H01J 41/04 |
| | | | 313/7 |
| 4,714,891 A * | 12/1987 | Morrison, Jr. | G01L 21/32 |
| | | | 307/326 |
| 4,747,311 A * | 5/1988 | Hojoh | G01L 9/0022 |
| | | | 324/460 |
| 5,128,617 A | 7/1992 | Bills | |
| 5,278,510 A | 1/1994 | Baptist et al. | |
| 5,422,573 A | 6/1995 | Bills et al. | |
| 5,866,901 A | 2/1999 | Penn et al. | |
| 6,257,069 B1 * | 7/2001 | Brady | G01L 21/34 |
| | | | 73/753 |
| 7,332,714 B2 | 2/2008 | Watanabe et al. | |
| 7,429,863 B2 | 9/2008 | Carmichael et al. | |
| 7,741,852 B2 * | 6/2010 | Watanabe | H01J 41/04 |
| | | | 324/462 |
| 7,768,267 B2 | 8/2010 | Knott et al. | |
| 7,906,971 B2 | 3/2011 | Boardwine et al. | |
| 8,648,604 B2 | 2/2014 | Brucker | |
| 2001/0011890 A1 * | 8/2001 | Kawasaki | G01L 21/32 |
| | | | 324/460 |
| 2003/0057953 A1 * | 3/2003 | Rutherford | G01L 21/34 |
| | | | 324/460 |
| 2004/0017202 A1 | 1/2004 | Peacock et al. | |
| 2005/0030044 A1 | 2/2005 | Correales | |
| 2006/0202701 A1 | 9/2006 | Knapp et al. | |
| 2006/0261819 A1 * | 11/2006 | Liu | G01N 27/62 |
| | | | 324/464 |
| 2007/0272874 A1 | 11/2007 | Grodzins | |
| 2008/0278173 A1 * | 11/2008 | Xiao | G01L 21/32 |
| | | | 324/460 |
| 2008/0315887 A1 * | 12/2008 | Carmichael | H01J 41/04 |
| | | | 324/460 |
| 2009/0096379 A1 | 4/2009 | Nakazato | |
| 2010/0090703 A1 | 4/2010 | Boardwine et al. | |
| 2011/0062961 A1 | 3/2011 | Brucker | |

FOREIGN PATENT DOCUMENTS

| | | |
|---|---|---|
| JP | 2010-281911 A | 10/1998 |
| JP | 2000-241281 A | 9/2000 |
| JP | 2004-349102 A | 12/2004 |
| WO | WO 2004/011895 | 2/2004 |

OTHER PUBLICATIONS

International Preliminary Report on Patentability, issued Aug. 24, 2010, for International Application No. PCT/US2009/034460.

* cited by examiner

IONIZATION GAUGE WITH OPERATIONAL PARAMETERS AND GEOMETRY DESIGNED FOR HIGH PRESSURE OPERATION

RELATED APPLICATIONS

This application is a divisional of U.S. application Ser. No. 12/860,050, filed Aug. 20, 2010, which is a continuation of International Application No. PCT/US2009/034460, which designated the United States and was filed on Feb. 19, 2009, published in English, which application claims the benefit of U.S. Provisional Application No. 61/066,631, filed on Feb. 21, 2008.

The entire teachings of the above applications are incorporated herein by reference.

BACKGROUND OF THE INVENTION

Ionization gauges, more specifically Bayard-Alpert (BA) ionization gauges, are the most common non-magnetic means of measuring very low pressures. The gauges have been widely used worldwide. These gauges were disclosed in 1952 in U.S. Pat. No. 2,605,431, which is herein incorporated by reference in its entirety. A typical ionization gauge includes an electron source, an anode, and an ion collector electrode. For the BA ionization gauge, the electron source is located outside of an ionization space or anode volume which is defined by a cylindrical anode screen. The ion collector electrode is disposed within the anode volume. Electrons travel from the electron source to and through the anode, cycle back and forth through the anode, and are consequently retained within, or nearby to, the anode.

In their travel, the electrons collide with molecules and atoms of gas that constitute the atmosphere whose pressure is desired to be measured. This contact between the electrons and the gas creates ions. The ions are attracted to the ion collector electrode, which is typically connected to ground. The pressure of the gas within the atmosphere can be calculated from ion and electron currents by the formula $P=(1/S)(I_{ion}/I_{electron})$, where S is a coefficient with the units of 1/Torr and is characteristic of a particular gauge geometry, electrical parameters, and pressure range.

SUMMARY OF THE INVENTION

The operational lifetime of a typical ionization gauge is approximately ten years when the gauge is operated in benign environments. However, these same gauges and electron sources (cathodes) fail in minutes or hours when operated at too high a pressure or during operation in gas types that degrade the emission characteristics of the electron source. Cathode interactions with the gauge environment can lead to decreased operational life. The oxide coating on the cathode can degrade when exposed to water vapor. Degradation of the oxide coating dramatically reduces the number of electrons generated by the cathode. Exposure to water vapor results in the complete burnout of a tungsten cathode.

Sputtering is also a problem, when operating the ionization gauge at high pressures, such as above $10^{-4}$ Torr. This is a problem at high pressure since there is more gas to ionize. This sputtering is caused by high impact energies between ions and components of the ionization gauge as has been demonstrated by the inventor. Ions with a high energy may impact a tungsten material that forms a collector post of the ionization gauge. This results in atoms being ejected from the collector post and envelope surfaces. This ejection carries a significant internal kinetic energy. Ejected material can travel freely to other surfaces within the line of sight of the material, and can cause gauge failure by coating the cathode or by coating of the feed-through insulators of the gauge, which can result in electric leakages.

The kinetic energy of the ions generated in a Bayard-Alpert ionization gauge is determined by a difference in the bias voltages between an anode grid and a collector post electrode. A bias voltage of a cathode is typically at 30 volts, and a bias voltage of the anode grid is traditionally operated at 180 volts. The collector voltage is usually fixed at a ground potential, or at a voltage near a ground potential. These voltage differentials are configured to provide 150 electron volts (eV) amount of energy for the electrons. This amount is capable of efficiently ionizing all gas species present in the gauge ionization volume. This potential difference also assures efficient transport of the electrons from the cathode to the anode volume. Efficient ionization is needed to assure an adequate signal to noise ratio from the collector at low gas density levels.

Operation of the anode grid at +180 volts results in energetic ions arriving at the grounded collector posts during operation. Those ions impact on the collector surfaces with kinetic energies ranging from between 0 to 180 eV. This large energy end of this spread is consistent with large sputtering yields.

For example, sputtering yields as large as 0.2 atoms/ion impact have been demonstrated for $Ar^+$ ions impinging on a tungsten target with 200 eV of kinetic energy. Ions also created outside of the anode grid can also reach the envelope walls with kinetic energies as large as 180 eV. Such large kinetic energy also increases sputtering yields, and these impacts remove materials from the envelope walls and adjacent structures.

The present disclosure decreases the anode grid voltage at high pressure levels in order to decrease the yield of sputtering impacts. The present ionization gauge provides for a reduction in an anode grid voltage down to about 80 volts to provide for about a five fold decrease in the sputtering yields for $Ar^+$ ions impinging on a tungsten collector surface. Reducing the cathode potential allows the anode to cathode voltage difference to still provide electrons capable of causing adequate ionization of atoms and molecules.

The effects of both ion energy and electron emission current on collector sputtering rates were experimentally tested in our laboratory through a long term study which tracked the operation of a large group of Micro-Ion® gauges in 35 mTorr of argon gas for several months. All tested gauges contained dual tungsten collectors of small initial diameter. As expected, the rate of collector diameter erosion (i.e. due to sputtering impacts between energetic argon ions and tungsten walls) was proportional to the electron emission current and highly dependent on ion energy. A change in grid voltage from 180V to 80V, representing an ion energy reduction from 180 to 80 eV, resulted in approximately 15-fold reduction in sputtering yields exceeding the predictions of the theoretical calculations based on current sputtering models. Gauges operated at reduced emission currents and reduced ion energies exhibited almost imperceptible collector erosion, no detectable signs of metallization of adjacent electrode structures and minimal change in filament operation parameters over time. The advantages of operation at low electron emission currents and low ion energies were fully demonstrated by this carefully monitored test.

There is provided an ionization gauge to measure pressure while reducing sputtering when operating at high pressure. The ionization gauge includes at least one electron source that generates electrons, and a collector electrode that collects ions formed by the collision between the electrons and gas molecules. The ionization gauge also includes an anode. The anode is configured to switch a bias voltage relative to a bias voltage of the collector electrode at a predetermined pressure to decrease a yield of sputtering impacts.

In one embodiment, the ionization gauge is configured so the anode operates at an initial bias voltage at one pressure range, such as, for example, below about $10^{-4}$ Torr. Then at high pressure, the anode operates at a reduced bias voltage, such as, for example, pressures above about $10^{-4}$ Torr.

The ionization gauge may also have a controller. The controller changes the bias voltage of the anode based on a pressure range of the pressure in the ionization gauge. The anode can switch the bias voltage so a potential difference between the anode and the collector is less than 90 volts. In another embodiment, the bias voltage of the anode may be switched so a potential difference between the anode and the collector is about 80 volts. In yet another embodiment, the gauge may have an electron source that operates at less than 20 volts, or that operates at about 10 volts.

In a further embodiment of the present disclosure, the ionization gauge has an anode grid, and the anode bias voltage can be switched from about 180 volts to 80 volts. Alternatively, the bias voltage is switched from about 180 volts to another anode bias voltage. The anode may operate at a reduced bias voltage at pressure of above about $10^{-4}$ Torr.

The ionization gauge may further include that the collector electrode surrounds the anode as a triode ionization gauge. Alternatively, the collector electrode can be positioned outside of the anode. The ionization gauge may further include a second collector electrode. The second collector electrode can be positioned outside the anode to collect ions formed at high pressure. The ionization gauge can be of the Bayard-Alpert type. The gauge may also include a cold cathode electron source.

In yet another aspect of the present invention, there is provided a method of measuring a gas pressure from gas molecules and atoms. The method includes producing electrons from at least one electron source and transmitting the electrons to an anode to form ions. Ions formed by the collisions between the electrons and the gas molecules and atoms are collected on the collector electrode. A bias voltage of an anode relative to a bias voltage of the collector electrode is switched to reduce an impact energy of the ions on the ion collector.

The ion collector potential preferably is selected to be at a low near ground potential to avoid leakage currents to ground, especially for low pressures when the ion collector current is relatively small. The cathode filament potential is typically selected to about 30 volts potential relative to ground, and also relative to the ion collector potential to avoid electrons arriving at the ion collector electrode with a predetermined energy, and this is relevant for a combination of high emission currents and low ion collector currents. The anode potential is typically selected to be at about 180 volts relative to ground.

A potential difference between the anode and the cathode determines the energy of the electrons as they arrive at the anode. The potential difference is typically selected to be about 150 volts. The anode is relatively higher than the cathode so that the energy of the electrons available for ionization of the gas is at about 150 electron volts. 150 eV is at a fairly low slope of an ionization probability versus electron energy curve for most gases. Therefore, at 150 eV an ionization gauge sensitivity variation with electron energy is minimized. It should be appreciated that this may depend on the specific gas species. Electrons are accelerated from the cathode to the anode at an energy of about 150 eV. It should be appreciated that generally lower values of this potential difference begins to allow the onset of space charge limiting of the electron emission from the cathode. Space charge limiting imposes an electron emission limit from the cathode and can bring on high temperature operation and failure of the cathode since a typical control circuit attempts to supply power to the cathode until a desired specified electron emission current is achieved. Lowering the cathode potential allows a lower anode potential to still achieve an acceptable anode to cathode potential difference without space charge limiting.

Secondly, a potential difference between the anode to the ion collector determines the maximum energy of the ions as they arrive at the ion collector. Ions formed near the anode will have the maximum energy, and ions formed relatively closer to the ion collector will have relatively less energy. The potential difference between the anode to the cathode or the gauge envelope is typically about 180 volts, and this dictates the energy and, thus, the impact of the ionized atoms and molecules when they arrive at the surface of the ion collector. The potential distribution in the anode has a shape such that a majority of the anode volume is near the potential of the anode, and a majority of the ions arriving at the ion collector have the maximum energy. The potential difference of the anode to cathode or gauge envelope also dictates the energy of the ions formed outside of the anode volume when they finally arrive at any relatively lower potential surfaces, such as, for example, the cathode, the collector shield, or an envelope of the gauge.

Altering the above mentioned potentials allows more electrons to arrive at the ion collector and reduces the measured ion collector current. However, more electrons will not change the positive ion current arriving at the ion collector. It should be appreciated that the measured collector current equals ions arriving at the collector minus electrons arriving at the collector. Any change in the potentials that will reduce the number of ions created, such as ionization probability, or reduce the number of created ions that are collected will reduce the actual ion current to the ion collector.

The number of created ions collected is dependent on the ion energy and the ion collector diameter, or ion collector geometry. At relatively low potential surfaces, sputtering is directly related to the number of ions created, the number of ions arriving at the surface of interest, and the energy of those ions. The sputtering rate is relevant to the number of atoms sputtered per unit time and relative to the number of incident ions per unit time. The sputtering yield is relevant to the number of atoms sputtered per incident ion and is related to the energy of incident ions. High pressure causes large ion currents, and consequently high pressure also causes large sputtering rates. By lowering the ion energy diminishes the sputtering yield, which may decrease the sputtering rate even at a relatively high pressure.

According to yet another aspect of the present disclosure, there is provided a process that includes providing a substrate, evacuating a tool to perform processes on the substrate in the tool, and measuring pressure. The method for measuring pressure includes an electron source that generates electrons, and an ionization volume in which the electrons impact a gaseous substance that includes gas molecules and atoms. The anode grid voltage is decreased at high pressure levels in order to decrease the yield of sputtering impacts. A collector electrode collects ions formed by the impact between the electrons and the gaseous substance.

The gauge can be used in a process. The process includes conducting operations on the substrate in the vacuum environment to form a processed substrate. In another embodiment, the process can include operations that are selected from the group consisting of operations associated with manufacture of a flat panel display, magnetic media operations, solar cell manufacturing operations, optical coating operations, semiconductor manufacturing operations, and any combination thereof. Operations may also include one or more processes selected from the group consisting of: physical vapor deposition, plasma vapor deposition, chemical vapor deposition, atomic layer deposition, plasma etch operations, implantation operations, oxidation, diffusion, a vacuum lithography process, a dry strip operation, an epitaxy process, a thermal processing operation, an ultraviolet lithography operation, and any combination thereof.

Preferably, current is converted from the collector electrode to a pressure signal to measure pressure. The process may also include measuring a parameter of a process using an analytical tool. In one embodiment, the analytical tool may measure a parameter of the wafer. The analytical tool can be selected from the group consisting of: a scanning electron microscope, an energy dispersive X-ray spectroscopy instrument, a scanning auger microanalysis instrument, a glow discharge mass spectroscopy instrument, an electron spectroscopy chemical analysis instrument, an atomic force microscopy instrument, a scanning probe microscopy instrument, a Fourier transform infrared spectroscopy instrument, a wavelength dispersive X-ray spectroscopy instrument, an inductively coupled plasma mass spectroscopy instrument, an x-ray fluorescence instrument, a neutron activation analysis instrument, a metrology instrument, and any combination thereof. A parameter of the process can be also measured using a mass spectrometer. The mass spectrometer can be one of a gas chromatograph instrument, a liquid chromatograph instrument, an ion trap instrument, a magnetic sector spectrometer instrument, a double-focusing instrument, a time-of-flight instrument, a rotating field instrument, an ion mobility instrument, a linear quadrupole instrument, or any combination thereof. The ionization gauge in the process preferably converts the current from the collector electrode to a pressure signal.

In yet another embodiment, a process may include a manufacturing process step and then measuring a parameter of the process using an analytical tool and measuring pressure. The pressure measurement is performed while decreasing the yield of sputtering impacts at high pressure. The analytical tool can be any mass spectrometer, or any previously mentioned instrument.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
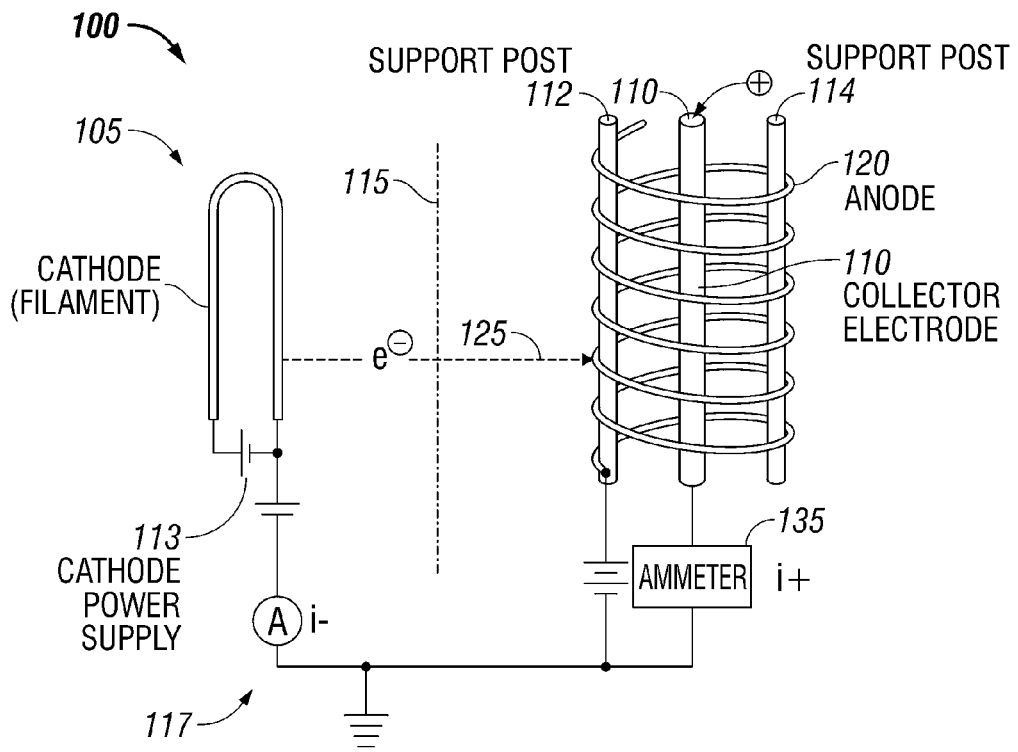
FIG. 1 is a schematic view of a generalized ionization gauge of the present disclosure.

Generally, as shown in FIG. 1, an ionization gauge 100 of the present disclosure has at least one electron source 105 and at least one collector electrode 110. The electron source 105 may be separated from the at least one collector electrode 110 by an optional isolation material 115 which prevents molecules and atoms of gas within a measurement chamber 117 from degrading the electron source(s) 105. The ionization gauge 100 also includes an ionization volume and specifically an anode 120. Anode 120 and the collector electrode 110 components may have various different configurations, and the gauge 100 is not limited to FIG. 1. In one embodiment, the ionization gauge 100 is a Bayard-Alpert type gauge, or an ionization gauge 100 where a heated cathode 105 is used to emit electrons toward an anode grid volume 120. However, it should be appreciated that the gauge 100 is not limited to any specific ionization gauge configuration and the present invention encompasses several different types of gauges.

The Bayard-Alpert type gauge 100 is based on the ionization of gas molecules by a constant flow of electrons. The negatively charged electrons shown as reference numeral 125 are emitted at a well-controlled selectable rate from a heated cathode 105, and may be released, or accelerated toward a positively charged anode 120. The electrons 125 pass into and through the anode 120 and then cycle back and forth through the anode 120. The electrons 125 are then retained within the ionization volume of the anode 120. In this space, the electrons 125 collide with the gas molecules to produce positively charged ions. These ions are collected by the one or more ion collector(s) 110. Collector 110 is nearly at ground potential, which is negative with regard to the positively charged anode 120. However, this arrangement is not limiting and collector 110 may have various potential differences with respect to the anode 120. At a constant cathode to anode voltage and electron emission current, the rate that positive ions are formed is directly correlated to the density of the gas in the gauge 100. This signal from the collector electrode 110 is detected by an ammeter 135, which is calibrated in units of pressure, for all pressure readings.

Figure 2:
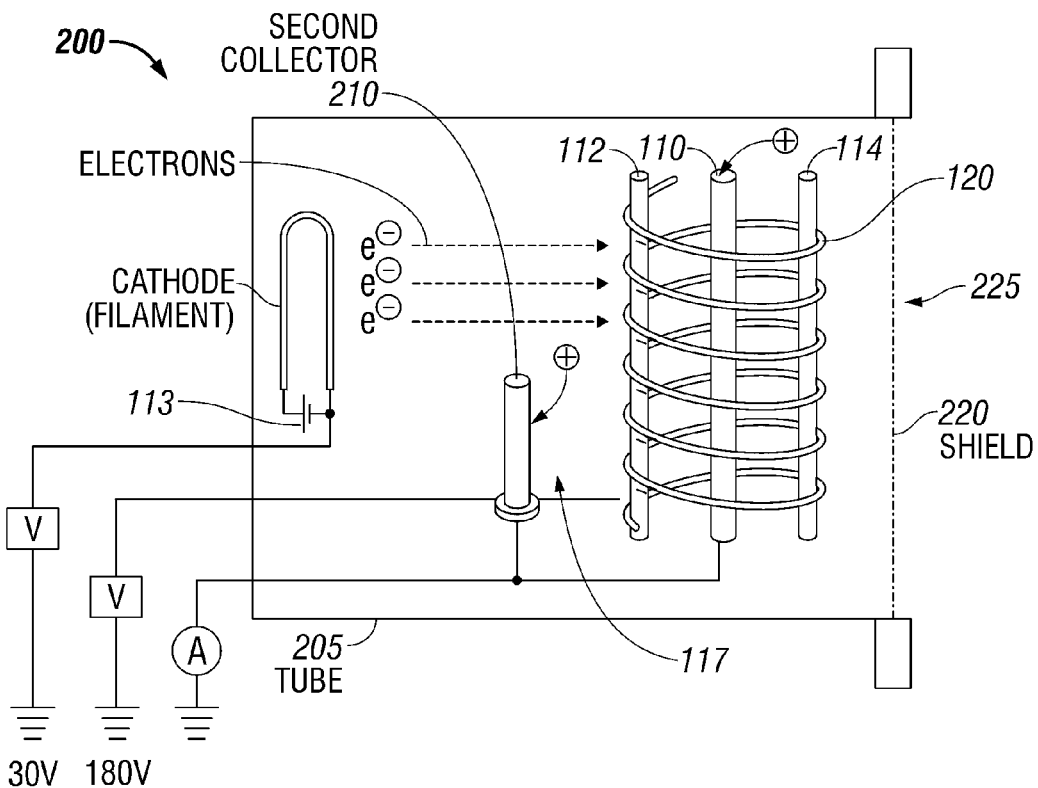
FIG. 2 is a detailed schematic view of a non-nude type ionization gauge of FIG. 1.

The embodiment of FIG. 1 is shown as a nude configuration of the Bayard-Alpert type gauge 100. It is also envisioned that non-nude type ionization gauges are also possible. FIG. 2 shows a specific non-nude type ionization gauge 200 embodying the present disclosure. The ionization gauge 200 has similar components to the ionization gauge 100 (FIG. 1) described above with the following additions. The ionization gauge 200 is housed in a tube 205. Tube 205 is opened at one end 225 to allow molecules and atoms of gas to enter the measurement chamber 117 through a shield 220. The shield 220 and tube 205 form a shield volume. An optional second ion collector 210 is added for high pressure measurements of very short mean free paths.

In operation, molecules and atoms of gas enter the measurement chamber 117 through the partially open shield 220. The shield 220 prevents potentials external to the shield 220 from disturbing the electric charge distribution within the measurement chamber 117. The shield 220 is maintained at a reference potential. In one embodiment, the reference potential is ground potential.

Figure 3:
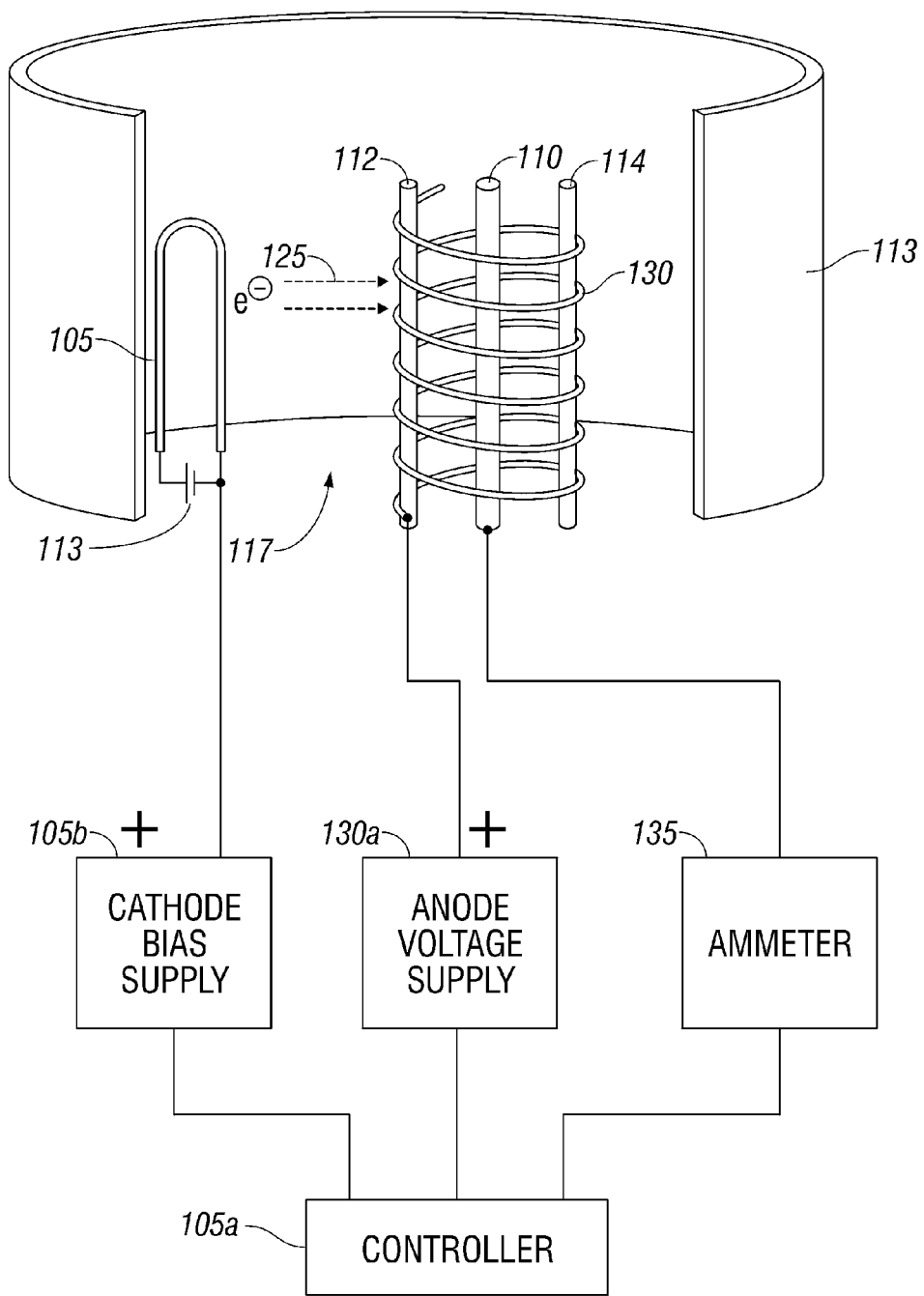
FIG. 3 is a schematic view of an ionization gauge including an anode coupled to an anode voltage supply for reducing an electron impact energy at high pressures according to the present disclosure.

Turning now to FIG. 3 the electron source (for example, a cathode filament) 105 generates electrons (represented by an electron beam 125) within the chamber 117 defined by the envelope 113. The electrons 125 are used in ionizing the gas molecules in the measurement chamber 117. The geometrical shape of the filament 105 can be a linear ribbon, a linear wire, a straight ribbon, a curved ribbon, a hairpin wire, or any other shape known in the art. In one embodiment, the cathode 105 is resistively heated to incandescence with an electrical current from cathode heating power supply 113. The thermionically emitted electrons 125 may be released, or accelerated or directed into the measurement chamber 117 towards anode 130. Electrons have a sufficient energy which allows the electrons to be transmitted to the ionization volume of anode 130 and have sufficient energy to enter the anode 130.

A controller 105a is connected to the cathode bias supply 105b, and the cathode 105 receives a cathode bias voltage of about 30 volts, and a heating voltage from power supply 113 during normal operation. Once the cathode 105 is sufficiently heated, the controller 105a controls the cathode 105 to maintain the appropriate electron current. The cathode bias voltage provides sufficient voltage difference from the cathode 105 to the anode 130 to transmit electrons 125 toward the anode grid 130. Ionization occurs over an energy spread both higher and lower than the nominal design energy; see Section 5.7 on ionization gauges in *Scientific Foundations of Vacuum Technique* by Saul Dushman, 1962, which is herein incorporated by reference in its entirety.

The controller 105a also is coupled to the anode voltage supply 130a, which delivers a bias voltage to the anode wire grid 130. The anode 130 includes an anode bias voltage of about 180 volts when measuring pressure at high vacuum conditions. This difference (180 volts minus 30 volts) provides for 150 eV of energy for the electrons. This is the amount of kinetic energy that is gained by a single free electron 125, when the electron 125 passes through a potential difference that is created between the cathode 105 and the anode grid 130. This 150 eV is sufficient to ionize all gas species present in the ionization gauge volume at high vacuum conditions.

These ionized atoms and molecules can have a maximum energy of about 180 eV when arriving at the ion collector 110. These ions formed in the ionization volume of the anode 130 will impact on the collector surface 110, and when operating at high pressure, this large quantity of ions may be excessive and can increase the sputtering rate for unit time. As mentioned, sputtering yields can be as large as 0.2 atoms/ion for $Ar^+$ ions impacting on tungsten targets with 200 eV kinetic energies, and this kinetic energy can damage the components of the gauge 100 and degrade the ionization gauge 100. To counteract high sputtering rates, an ionization gauge design may also decrease sputtering yields.

The present ionization gauge 100 decreases anode grid bias voltage levels relative to the bias voltage of the collector 110 at high pressure levels to decrease the yield of sputtering collisions. A reduction of the anode grid bias voltage to about 80 volts can provide for about a five fold decrease in the sputtering yield for $Ar^+$ ions impacting on a tungsten surface of a collector electrode 110. Although reducing the bias voltage of the anode grid 130, the energy of the electrons remains sufficiently high for their collisions with gas atoms and molecules to ionize all gas species present in the ionization volume in the anode grid 130. At the same time, the kinetic energy of the ions is decreased to lessen the energy of ions arriving at the collector 110, envelope walls, and adjacent grounded electrode structures (not shown). This occurs while providing sufficient potential difference between cathode 105 and anode 130 so electrons 125 can enter the anode grid volume 130 while reducing sputtering yields.

Notably, a byproduct of the bias voltage reduction can be a decrease in a sensitivity of the ionization gauge 100. Since this reduction occurs at high pressure levels, or above $10^{-4}$ Torr, the ion current signal received by the collector electrode 110 is relatively large. This received signal/noise level by the collector 110 is adequate for operation of the ionization gauge 100.

In a first embodiment, the ionization gauge 100 includes that the controller 105a, reduces a bias voltage of the anode grid 130 in a high pressure mode. In the embodiment shown, preferably the controller 105a sufficiently reduces the bias voltage supplied to the anode grid 130 by controlling anode voltage supply 130a. The anode grid 130 operates at an anode bias voltage of less than 180 volts. This reduced bias voltage results in reduced electron kinetic energy from 150 eV, or the potential difference between the cathode 105 and the anode grid 130.

Notably, this reduced electron kinetic energy of less than 150 eV is still sufficient to ionize all gas species present in the ionization gauge 100 volume. The values of threshold ionization energies required for different monatomic species can range from 3.88 eV (Cs) to 24.58 eV (He), and 15 eV (for oxygen, nitrogen, and hydrogen). Various ionization energies are possible and are within the scope of the present disclosure, depending on the gaseous material that is desired to be measured.

In another embodiment, the controller 105a outputs a control signal to the anode voltage supply 130a to reduce the anode bias voltage supply from 180 volts to 80 volts, or less. In this embodiment, the electron energy, or difference between the bias voltage of the cathode 105 and the anode 130 is 50 eV. This amount is sufficient to ionize the gas at high pressures without causing the degradation of the ionization gauge 100 that is attributed to high sputtering yields. This results in a decrease in the yield of sputtering impacts for $Ar^+$ ions impinging on tungsten collector electrode 110 surface, and this 50 eV value may provide for a five-fold decrease in the sputtering yield. It should be appreciated that other anode bias voltages are also envisioned, and the present ionization gauge 100 is not limited to any specific anode bias voltage reduction.

In one embodiment, the ionization gauge 100 is configured so the anode 130 operates at an initial bias voltage at one pressure and then automatically operates at a reduced bias voltage at high pressures, such as, for example, above about $10^{-4}$ Torr. The controller 105a can switch automatically the bias voltage so a potential difference between the anode 130 and the collector electrode 110 is less than 90 volts.

In another embodiment, the bias voltage of the anode 130 may be switched from about 180 volts to about 80 volts so a potential difference between the anode 130 and the collector electrode 110 is about 80 volts. The cathode filament 105, can be supplied less than 20 volts, or can be supplied at about 10 volts so that an adequate voltage difference from the cathode 105 to the anode 130 is maintained. The anode 130 can operate at a reduced bias voltage at high pressures or above about $10^{-4}$ Torr.

At low pressure, where high sputtering yields are not as much of a concern relative to the high pressure conditions discussed above, the controller 105a may control the anode bias voltage supply 130a to increase the anode bias voltage supply. The potential difference can be increased for sufficient ionization energies. This ensures that the electrons have sufficient energy to efficiently ionize a very low density of gas.

It should be appreciated that the bias voltage of the cathode 105 cannot be too low, and has to be above the collector electrode 110, and the envelope wall 113. Preferably, the cathode 105 is about 10 volts above the collector electrode 110.

The present ionization gauge 100 is not limited to controlling the bias voltage of the anode grid 130. It is envisioned that the bias voltage of the filament 105 and the collector electrode 110 can also be modified by controller 105a. The bias voltage of the filament 105 and the collector electrode 110 can also be modified by controller 105a to minimize sputtering yields, and to extend the life of the ionization gauge 100. It should also be appreciated that the ionization gauge 100 may be configured as a triode ionization gauge (not shown) or another specific type of gauge 100. It should be appreciated that the present ionization gauge 100 is not limited to a BA ionization gauges, and may include a cold cathode electron emitter 105.

The energy of the ions can be determined by the difference between the ion collector 110 and the anode 130. Here, the anode 130 can be kept constant and the collector 110 can be raised above ground potential to reduce the energy of the ions.

Figure 4:
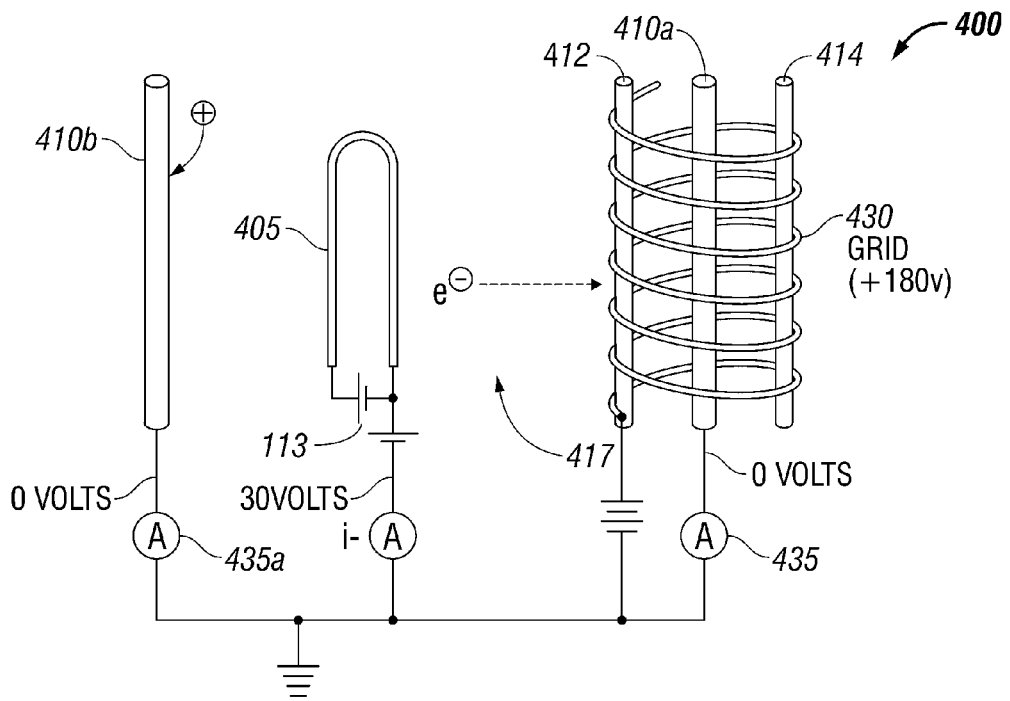
FIGS. 4 through 6 show several schematic views of embodiments of ionization gauges for collecting ions using a second collector at high pressure, and for extending the measuring range of the ionization gauge.

Turning now to FIG. 4, there is shown another embodiment of the present disclosure. Here, the ionization gauge is a Bayard-Alpert ionization gauge 400; however, gauge 400 can alternatively be manufactured as a cold electron emitter ionization gauge 400 with a cold electron emitter source. Gauge 400 includes an anode grid 430, a cathode filament 405, and a first ion collector electrode 410a. The anode 430 surrounds the first ion collector electrode 410a.

Typically, Bayard-Alpert ionization gauges are used to measure pressure in the high vacuum and ultrahigh vacuum environment. Pressure measurement capabilities become compromised at high vacuum levels or at about $10^{-4}$ Torr, and become even more limited at about $10^{-3}$ Torr. One observed problem is that at higher pressures electrons scatter on their way to the anode grid 430. Long electron trajectories are compromised by scattering collisions with neutral species. Additionally, the ability to effectively collect ions inside the anode 130 is compromised as the ion density builds up around the collector post 410a.

The present ionization gauge 400 preferably collects ions at high pressure that are located outside of the anode grid 430. This collection extends the effective pressure operating range above $10^{-4}$ Torr.

In this embodiment, a second ion collector 410b can be positioned in a location near or closer to the cathode filament 405. Collector electrode 410b assures efficient collection of ions, which are located near the electron source 405 at high pressures. Collector electrode 410b is configured for use as an alternative second ion collector electrode 410b to collect ions formed outside of the anode 430 at high pressures. Second collector electrode 410b extends the operating range of the gauge 400 to levels above 100 mTorr with a minimum detectable pressure limit as low as $10^{-5}$ Torr. This provides for better overlap with a heat loss or a capacitance diaphragm pressure sensor in a combination gauge. This also provides for no lost time attributed to sensor switching during process cycles in PVD, semiconductor, and hard disk manufacturing processes. This also preserves the base measurement capabilities expected from the gauge 400 and which are needed for a vacuum qualification of the instrument.

The ionization gauge 400 may also include that the second ion collector electrode 410b is positioned near the filament 405, and is supported in an extra filament support post (not shown). This is advantageous in a retrofit installation of the second ion collector electrode 410b to an existing gauge. In yet another alternative embodiment, the second collector electrode 410b is supported in another support structure, such as, for example, a support post which is located near the anode grid 430. Various support configurations are possible.

Figure 5:
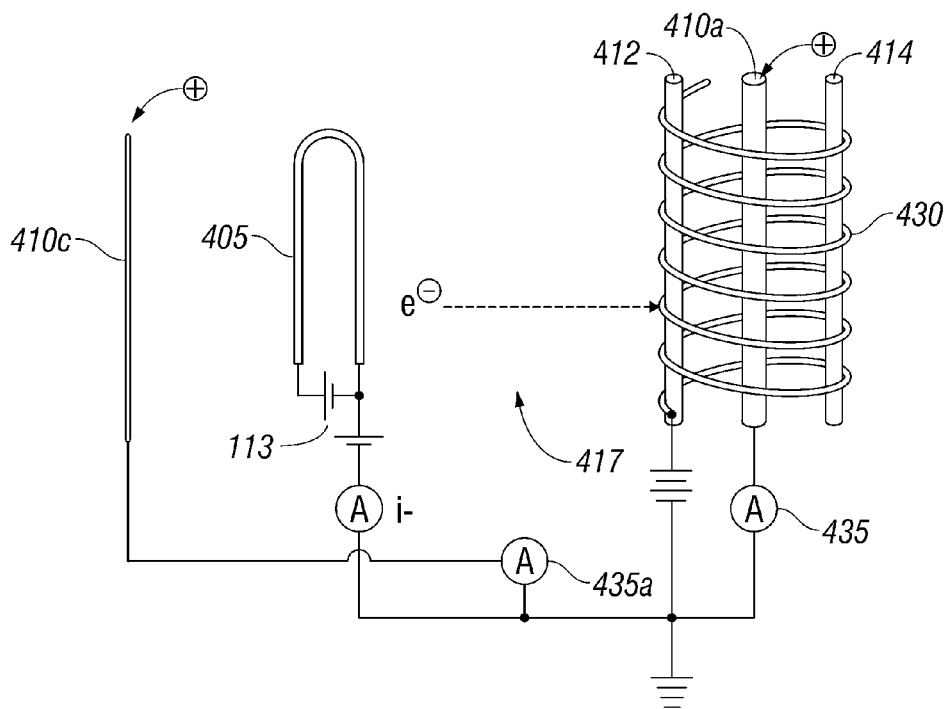
Figure 6:
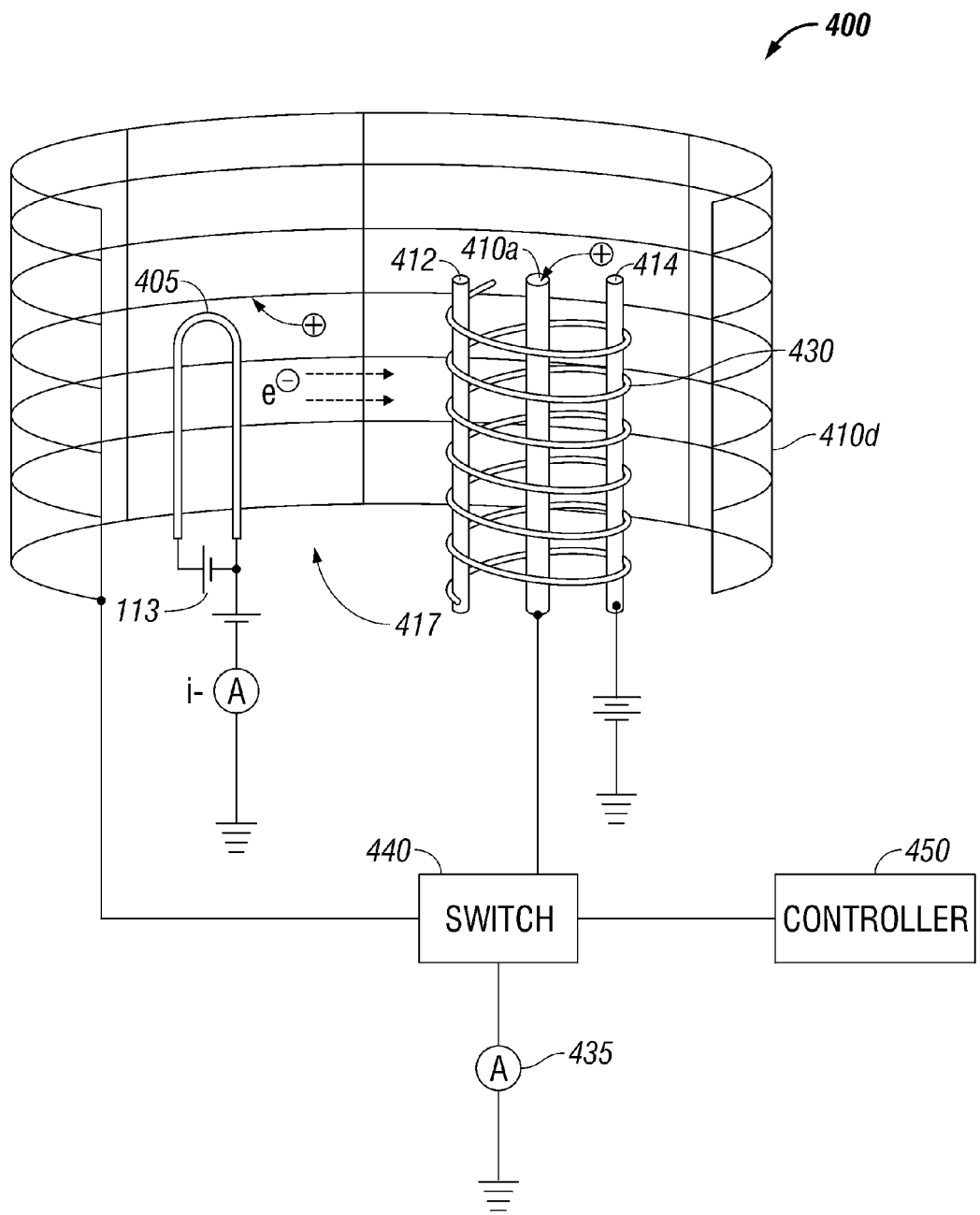

The second ion collector electrode 410b can be a post 410b as shown in FIG. 4, or an electrode plate 410c (FIG. 5), or can be formed as an electrode grid or wall 410d (FIG. 6). The second ion collector electrode 410c of FIG. 5 can be connected to an ammeter 435a, or may alternatively be operatively coupled to the collector electrode 410a, which is connected to the ammeter 435. The second collector 410b can be connected to a different ammeter 435a, or the same ammeter 435 as collector 410a to measure ions, and gauge 400 is not limited to any specific configuration.

Turning to FIG. 6, the second ion collector may be formed as an intermediate wall 410d. Collector wall 410d surrounds the anode 430 and the first ion collector electrode 410a and the cathode 405.

The intermediate wall 410d may be connected to a switch 440 (FIG. 6). Switch 440 provides for two modes of collecting ions, namely a high pressure operation mode and a normal (high vacuum) operation mode. In the high pressure operation mode, the ionization gauge 400 collects ions using the second ion collector grid or wall 410d. In normal (high vacuum) operation mode, the first ion collector electrode 410a collects ions. Gauge 400 can be switched between collecting ions using collector 410a or collector 410d using switch 440, which can be manually controlled or electronically controlled. Pressure is measured using detected signals received by the ammeter 435 which is connected to the controller 450. One collector would be used at high pressures, while at a different pressure, the other collector electrode would be used to measure pressure.

The intermediate wall 410d can advantageously be installed in a retrofit manner to existing BA ionization gauges 400. In this aspect, a switch 440 can be installed in a retrofit manner and connected between the ammeter 435 and the first ion collector electrode 410a in an existing BA ionization gauge 400.

It should be appreciated that the cathode emission level may remain constant, as well as, the voltage bias on the anode 430. In one embodiment, the ammeter 435 would detect a pressure of $1\times10^{-4}$ Torr, and then output a signal to a controller 450. The controller 450, in response, would then switch from collecting ions using the first ion collector electrode 410a to collecting ions using the second ion collector 410d to collect ions formed closer to the filament 405.

In another embodiment, the ion current measurement may effectively self-switch from one collector to another collector whereby the ion current diminishes significantly from the inside collector as the pressure increases from above about $10^{-3}$ Torr, and then diminishes significantly from the outside collector as the pressure decreases below $10^{-3}$ Torr. It should be appreciated that ion current from the outside collector is generally not a concern below $10^{-4}$ Torr.

It should be appreciated that the ionization gauge 400 may be formed with more than two ion collector electrodes 410a, 410d. Gauge 400 may include a second ion collector 410d, and a third ion collector electrode (not shown), or more collector electrodes being placed near the filament 405 to collect ions at high pressures. Various configurations are possible and within the scope of the present disclosure.

Figure 7:
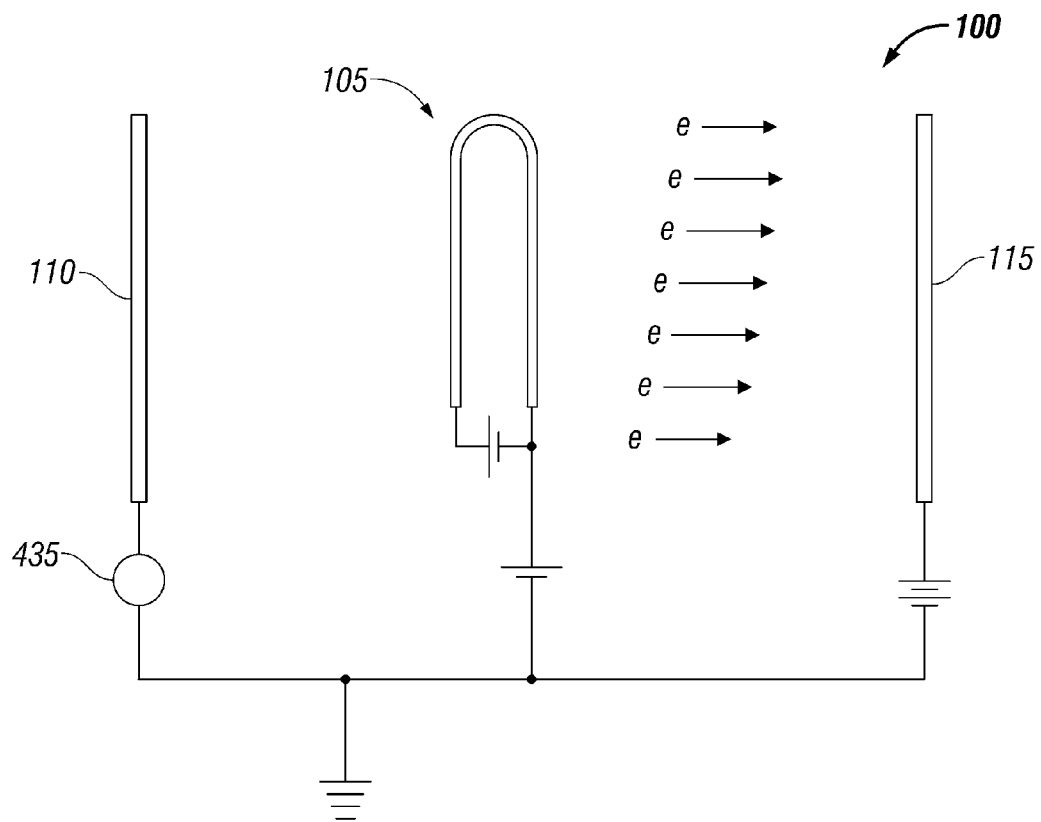
FIG. 7 shows a Schultz-Phelps ionization gauge of the present disclosure.

In another embodiment shown in FIG. 7, an ionization gauge 100 may be configured in a Schultz-Phelps geometry with the anode 115 being arranged as a flat plate, the ion collector 110 as a parallel flat plate, and the electron source 105 positioned between those two plates 110, 115.

Figure 8:
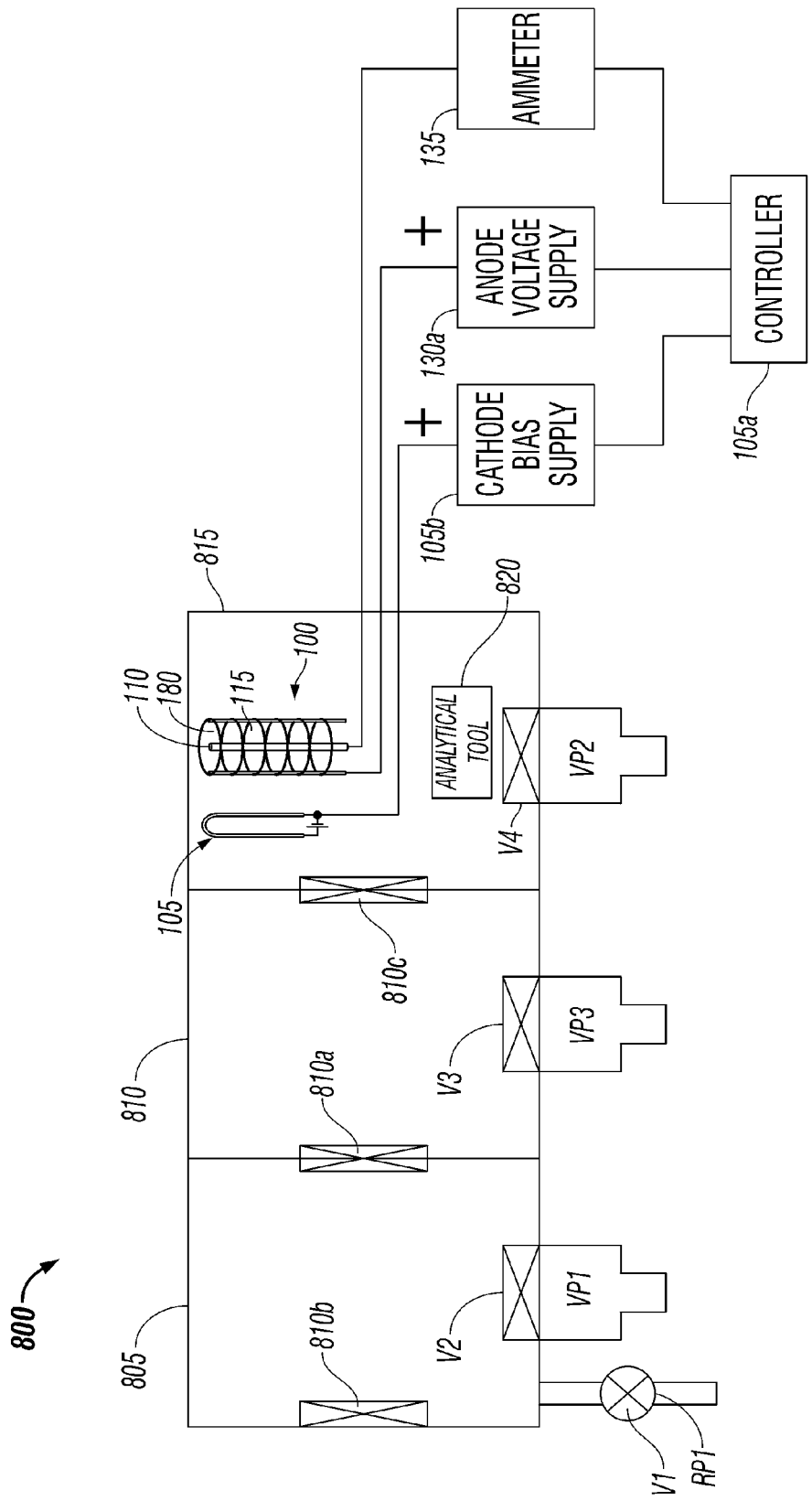
FIG. 8 shows the ionization gauge of FIG. 3 used with a cluster tool and an analytical tool for processing operations.

Turning to FIG. 8, the ionization gauge 100 preferably can be used with a cluster tool 800 or another multi-chamber tool for processing operations. In one embodiment, the cluster tool 800 may include a load lock chamber 805 connected to a transfer chamber 810 by a valve 810a. The load lock chamber 805 is sealed from ambient conditions by a valve 810b. Both a single chamber and multi-chamber cluster tools 800 are envisioned, and the ionization gauge 100 can be used in either a single chamber or a multi-chamber tool configuration. It should be appreciated that the ionization gauge 100 is not limited for use with a vacuum chamber, and can be used in any manufacturing chamber known in the art.

The cluster tool 800 may also include a process module 815. Process module 815 is also connected to the transfer chamber 810 by a valve 810c. The tool 800 may includes multiple process modules 815 and multiple load lock chambers 805, and the configuration shown is not limiting. The load lock chamber 805 may include a rough pump RP1, which also is connected to the load lock chamber 805 by a valve $V_1$. Each of the load lock chamber 805, the transfer chamber 810, and the process module 815 may include at least one vacuum pump $Vp_1$, $Vp_2$, and $Vp_3$. The vacuum pump may be a cryogenic vacuum pump, or another pump, such as a turbo pump or water vapor pump. Various pumping configurations are possible and within the scope of the present disclosure.

Preferably, a wafer (not shown) may be introduced into the load lock chamber 805, and pumped to vacuum conditions using the rough pump $Rp_1$ and the vacuum pump $Vp_1$. Using a wafer manipulating robot (not shown), the wafer can be manipulated to the transfer chamber 810 through the valve 810a, and then the wafer can be placed in the process module 815 through the valve 810c for various deposition operations. In one embodiment, the ionization gauge 100 may be placed in one of the chambers 805, 810, or 815 of the cluster tool 800. For illustration purposes, the ionization gauge 100 is shown in the process module 815, but is not limited to any specific chamber or location, and can be placed outside of the chamber or tool 800.

The ionization gauge 100 preferably can measure pressure both base pressure (high vacuum) and higher processing pressures (mostly in the mTorr range), however this is not limiting and various operational parameters for measurement are possible and within the scope of the present disclosure. The ionization gauge 100 can be used to measure pressure in the manufacture of flat panel displays, magnetic media operations, solar cells, optical coating operations, semiconductor manufacturing operations, and other manufacturing process operations. Such processes may include physical vapor deposition, plasma vapor deposition (PVD), chemical vapor deposition (CVD), atomic layer deposition (ALD), plasma etch operations, implantation operations, oxidation/diffusion, forming of nitrides, vacuum lithography, dry strip operations, epitaxy operations (EPI), rapid thermal processing (RTP) operations, extreme ultraviolet lithography operations, and others. Preferably, the ionization gauge 100 may also be operable with one or more analytical tools, such as, for example, a microscope or a mass spectrometer. Mass spectrometers may include gas chromatograph instruments (GC), liquid chromatograph instruments (LC), ion trap instruments, magnetic sector spectrometers instruments, double-focusing instruments, time-of-flight instruments (TOF), rotating field instruments, ion mobility instruments, linear quadrupole instruments, and others.

Surface analytical instruments 820 that can be used in connection with the ionization gauge 100, and with the cluster tool 800 (or without the cluster tool 800) may also include scanning electron microscopes, energy dispersive X-ray spectroscopy instruments (EOS/XPS), scanning auger microanalysis instruments (Auger/SAM), glow discharge mass spectroscopy instruments (GDMS), electron spectroscopy for chemical analysis instruments (ESCA), atomic force microscopy/scanning probe microscopy instruments (AFM/SPM), Fourier transform infrared spectroscopy instruments (FTIR), wavelength dispersive X-ray spectroscopy instruments (WDS), inductively coupled plasma mass spectroscopy instruments (ICPMS), x-ray fluorescence instruments (XRF), neutron activation analysis instruments (NAA), metrology instruments, and others. It should be appreciated that this listing is not exhaustive and the gauge 100 may be used with other instruments not enumerated above.

While this invention has been particularly shown and described with references to preferred embodiments thereof, it will be understood by those skilled in the art that various changes in form and details may be made therein without departing from the scope of the invention encompassed by the appended claims.

What is claimed is:

1. An ionization gauge to measure pressure comprising:
an anode enclosing a volume;
an electron source that generates electrons outside of the anode;
an inside ion collector electrode, located inside of the anode, that collects ions formed by the impact between the electrons and gas molecules and atoms inside the anode; and
an outside ion collector electrode, located outside of the anode, that collects ions formed by the impact between the electrons and gas molecules and atoms outside the anode, the outside ion collector electrode being closer than the inside ion collector electrode to the electron source, to collect ions at pressures above about $10^{-4}$ Torr.

2. The ionization gauge of claim 1, wherein the bias voltage of the anode is switched to a reduced level during normal operation with pressure above $10^{-4}$ Torr to decrease a yield of sputtering collisions.

3. An ionization gauge as claimed in claim 1, further comprising a switch that provides for collection of the ions using the outside ion collector electrode in a high-pressure mode of operation and collection of ions using the inside ion collector electrode during a normal mode of operation.

4. The ionization gauge of claim 1, wherein the outside ion collector surrounds the anode, the inside ion collector electrode and the electron source.

5. A method of measuring a gas pressure from gas molecules and atoms, comprising the steps of:
producing electrons from an electron source outside of an anode;
transmitting the electrons to the anode to form ions;
collecting ions formed by impact between the electrons and gas molecules and atoms inside the anode with an inside ion collector electrode located inside the anode; and
collecting ions formed by impact between the electrons and gas molecules and atoms outside of the anode with an outside ion collector electrode, located outside the anode and closer than the inside ion collector electrode to the electron source, at pressures above about $10^{-4}$ Torr.

6. The method of claim 5, wherein the bias voltage of the anode is switched to a reduced level during normal operation with pressure above $10^{-4}$ Torr to decrease a yield of sputtering collisions.

7. The method of claim 5, further comprising switching between collection of the ions using the outside ion collector electrode in a high-pressure mode of operation and collection of ions using the inside ion collector electrode during a normal mode of operation.

8. The method of claim 5, wherein the outside ions collector surrounds the anode, the inside ion collector electrode and the electron source.

9. An ionization gauge to measure a pressure comprising:
an anode enclosing a volume;
an electron source that generates electrons;
a low-pressure ion collector electrode, located to a side of the anode opposite to the electron source, that collects ions formed by the impact between the electrons and gas molecules and atoms at low pressures; and
a high-pressure ion collector electrode, located to a same side of the anode as the electron source, that collects ions formed by the impact between the electrons and gas molecules and atoms, the high-pressure ion collector electrode being closer than the low-pressure ion collector electrode to the electron source to collect ions at ion pressures above about $10^{-4}$ Torr.

10. A method of measuring gas pressure from gas molecules and atoms comprising the steps of:
releasing electrons from an electron source;
transmitting the electrons through an anode enclosing a volume to form ions;
collecting ions formed by the impact between the electrons and gas molecules and atoms with a low-pressure ion collector electrode to a side of the anode opposite to the electron source; and
at pressures above about $10^{-4}$ Torr, collecting ions formed by impact between the electrons and gas molecules and atoms to a same side of the anode as the electron source with a high-pressure ion collector electrode that is closer than the low-pressure ion collector electrode to the electron source.

* * * * *